United States Patent
Franken

(10) Patent No.: US 10,189,152 B2
(45) Date of Patent: Jan. 29, 2019

(54) SAFETY HAMMER FOR BREAKING GLASS, METHOD FOR ASSEMBLY OF A SAFETY HAMMER, SAFETY TOOL HOLDER, SYSTEM FOR HOLDING A SAFETY TOOL AND KIT OF PARTS

(71) Applicant: LIFE SAFETY PRODUCTS B.V., Zoetermeer (NL)

(72) Inventor: Johannes Baptist Martinus Franken, Zoetermeer (NL)

(73) Assignee: LIFE SAFETY PRODUCTS B.V., Zoetermeer (NL)

( * ) Notice: Subject to any disclaimer, the term of this patent is extended or adjusted under 35 U.S.C. 154(b) by 800 days.

(21) Appl. No.: 14/380,831

(22) PCT Filed: Feb. 27, 2013

(86) PCT No.: PCT/NL2013/050121
§ 371 (c)(1),
(2) Date: Aug. 25, 2014

(87) PCT Pub. No.: WO2013/137718
PCT Pub. Date: Sep. 19, 2013

(65) Prior Publication Data
US 2015/0059529 A1    Mar. 5, 2015

(30) Foreign Application Priority Data
Feb. 27, 2012 (NL) .................................... 2008358

(51) Int. Cl.
*B25D 1/02* (2006.01)
*B25G 3/24* (2006.01)
(Continued)

(52) U.S. Cl.
CPC .................. *B25D 1/02* (2013.01); *A62B 3/00* (2013.01); *A62B 3/005* (2013.01); *B25D 1/14* (2013.01);
(Continued)

(58) Field of Classification Search
CPC ...... B25D 1/02; B25D 1/14; B25D 2250/271; B25G 3/12; B25G 3/14; B25G 3/26; B25F 1/006
(Continued)

(56) References Cited

U.S. PATENT DOCUMENTS 117,609 A * 8/1871 Davids .................... B25D 1/02
81/19
2,653,060 A * 9/1953 Rubenstein ............. B25D 1/02
403/217
(Continued)

FOREIGN PATENT DOCUMENTS

| DE | 202010016696 | 3/2011 |
| DE | 202011100377 | 9/2011 |
| EP | 1372912 | 1/2004 |

OTHER PUBLICATIONS

International Search Report issued in PCT Application No. PCT/NL2013/050121.

*Primary Examiner* — Bryan R Muller
(74) *Attorney, Agent, or Firm* — Lucas & Mercanti, LLP

(57) ABSTRACT

A safety hammer (1) for breaking glass, comprises a housing (2) comprising at least two shell parts (2a, 2b); a hammer head (3) having at least one end (4) for breaking the glass, wherein the hammer head (3) is at least partly enclosed by the shell parts (2a, 2b) such that the at least one end (4) of the hammer head (3) extends outside the housing (2); wherein the hammer head (3) is arranged for cooperation with the shell parts (2a, 2b) for fastening the shell parts (2a, 2b) via the hammer head (3). A safety tool holder com-
(Continued)

prises a base holder element and at least one intermediate holder element arranged for removable coupling to the base holder element at one end and for removable coupling to a safety tool at another end; wherein the intermediate holder element is provided with a single connecting element for removable connection to the safety tool.

17 Claims, 10 Drawing Sheets

(51) Int. Cl.
*B25G 3/26* (2006.01)
*B25G 3/12* (2006.01)
*B25D 1/14* (2006.01)
*B60R 11/06* (2006.01)
*B25F 1/00* (2006.01)
*B25F 1/04* (2006.01)
*A62B 3/00* (2006.01)
*B25G 1/00* (2006.01)

(52) U.S. Cl.
CPC ............... *B25F 1/006* (2013.01); *B25F 1/04* (2013.01); *B25G 1/00* (2013.01); *B25G 3/12* (2013.01); *B25G 3/24* (2013.01); *B25G 3/26* (2013.01); *B60R 11/06* (2013.01); *B25D 2250/065* (2013.01); *B25D 2250/271* (2013.01); *B25D 2250/295* (2013.01); *Y10T 29/49826* (2015.01)

(58) Field of Classification Search
USPC .................................................. 7/144; 81/26
See application file for complete search history.

(56) References Cited

U.S. PATENT DOCUMENTS

| | | | | |
|---|---|---|---|---|
| 5,878,478 | A * | 3/1999 | Hasegawa | A62B 3/005 206/349 |
| 7,051,391 | B2 * | 5/2006 | Wang | B25F 1/00 7/144 |
| 8,539,862 | B1 * | 9/2013 | Robinson | B60R 22/00 24/578.13 |
| 2004/0040094 | A1 * | 3/2004 | Lin | B25F 1/04 7/144 |
| 2006/0064822 | A1 * | 3/2006 | Wang | A62B 3/005 7/144 |
| 2007/0080273 | A1 | 4/2007 | Michalo | |

\* cited by examiner

SAFETY HAMMER FOR BREAKING GLASS, METHOD FOR ASSEMBLY OF A SAFETY HAMMER, SAFETY TOOL HOLDER, SYSTEM FOR HOLDING A SAFETY TOOL AND KIT OF PARTS

CROSS REFERENCE TO RELATED APPLICATIONS

This application is a 371 of PCT/NL2013/050121, filed Feb. 27, 2013, which claims the benefit of Netherlands Patent Application No. 2008358, filed Feb. 27, 2012, the contents of each of which are incorporated herein by reference.

BACKGROUND OF THE INVENTION

Field of the Invention

The invention relates to a safety hammer, in particular to a safety hammer for breaking glass.

Such devices are well known. Publication EP 1 372 912 describes a safety hammer of the applicant. The safety hammer comprises a housing and a hammer head. The housing comprises at least two shell parts that at least partly enclose the hammer head. The hammer head is provided with at least one end for breaking glass, which extends outside the housing.

Assembly of the hammer head and the shell parts of the housing can be done by positioning the hammer head into a first shell part and then connecting a second shell part to the first shell part by connection means such as small screws. Other assembly methods are also used. A drawback of the common assembly methods however is, that the various parts of the safety hammer are difficult to assemble with small connection components such as screws. In addition, the connection of the shell parts may not be reliable during the life time of the safety hammer. For example, once assembled, the connection screws can shake loose during the life time of the safety hammer, in particular when mounted in a car or a train. Thus the quality of the safety hammer can reduce during its life time.

Therefore, there is a need for a safety hammer that can more easily and/or reliable be assembled.

SUMMARY OF THE INVENTION

Thereto, the invention provides for a safety hammer according to claim 1.

By arranging the hammer head for cooperation with the shell parts for fastening the shell parts under enclosure of the hammer head, the hammer head forms part of the fastening system for assembling the safety hammer. By providing the hammer head as a part of the fastening system, a reliable connection can be obtained, while in addition, other connection parts can be spared. By providing the hammer head as part of the fastening system to fasten the shell parts to each other, preferably no loose parts, such as screws or bolts, are required to fasten the shell parts to each other under enclosure of the hammer head. Preferably, the hammer head replaces the conventional fastening means, such as screws, to fasten the shell parts to each other. In the absence of loose conventional fastening means, the assembly of the safety hammer can be done faster, requiring less assembly steps and/or more cost effective.

In a preferred embodiment, the hammer head is the single fastening means for fastening the shell parts to each other, thus providing for a simple and reliable connection of the shell parts. Coupling elements and/or alignment elements may be provided optionally as secondary means for assisting the assembly by the hammer head.

Advantageously, the shell parts are provided with coupling elements for coupling the shell parts together at a position remote from the hammer head. Such coupling elements are advantageously provided to assist that the shell parts remain closed and/or to prevent that the shell parts accidently open remote from the hammer head. Also, the coupling elements may assist in positioning the shell parts with respect to each other during assembly of the safety hammer. Preferably, the additional coupling elements are provided at an end of the safety hammer opposite the hammer head. In an advantageous embodiment, the additional coupling elements may be provided as a hook on one shell part and an eye on another shell part, the hook and the eye can then be coupled to each other, while the hammer head provides for the fastening of the shell parts to each other. Instead of hook-eye coupling elements, also click fingers or other coupling elements may be provided.

For example, during assembly first the shell parts may be hooked at one end to each other. Then, at an opposite end, the shell parts can be fastened to each other via the hammer head, so a relatively simple and fast assembly can be possible.

Advantageously, at least one shell part is provided with a cooperating element for cooperation with the hammer head. Preferably, the cooperating element is arranged to receive the hammer head, e.g. as an eye or a ring or an opening or fingers between which the hammer head may be clamped. For example, the shell part can be provided with an opening through which the hammer head can be received, e.g. such that an interference fit between the hammer head and the opening can be obtained.

Also both shell parts can be provided with a cooperating element for cooperation with the hammer head for fastening the shell parts together via the hammer head. For example, both shell parts can be provided with an opening or an eye or a ring through which the hammer head can be received. In a simple way, the hammer head can thus be connected to both shell parts to assemble the safety hammer.

In an advantageous embodiment, the hammer head can be connected to the shell parts by an interference fit to provide for a form secure, connection. The hammer head may comprise two head parts which can be connected to each other and/or to the shell parts via an interference fit. For example, a head bush may be provided to connect the two head parts to each other and to the shell parts for fastening the shell parts under enclosure of the hammer head. Alternatively, click fingers may be provided that click into recesses of the other head part and/or shell part to form an interference fit.

The safety hammer can further be provided with a connecting element for removable connection to a holder. For example, the housing of the safety hammer can specifically be designed for connection to a holder, or the housing can have a specific provision, such as a groove or a pin or a click finger etc., for connection with a holder.

Further, to assist the assembly of the shell parts, alignment elements may be provided on at least one shell part. The alignment elements may assist in aligning both shell parts with respect to each other, for example prior to fasten via the hammer head. The alignment elements may be pins or ribs or fingers, etc.

The invention also relates to a holder for holding a safety tool, such as a safety hammer. Such holders are known. For example, publication U.S. Pat. No. 4,592,467 discloses a conventional wall holder for a safety hammer. Such a conventional holder for a safety hammer is relatively large and is, usually by means of screws, fixed to a wall element. Such a wall element can be a vehicle floor or a vehicle ceiling or a mid console. However, a safety hammer mounted at such a location, is usually difficult to reach by the driver and/or passengers of the vehicle. In addition, due to the relatively large dimensions of the conventional safety hammer holder, it can only be mounted at limited locations in a vehicle, thereby reducing the accessibility of the safety hammer. Further, by fixedly mounting the holder to the wall element, the wall element may be impaired.

There is a need for a holder for a safety tool which at least provides for flexibility in mounting of the safety tool in the vehicle interior. An object of the invention is to provide for a holder for a safety tool that obviates at least one of the above mentioned drawbacks.

A safety tool holder comprising a base holder element and at least one intermediate holder element arranged for removable coupling to the base holder element at one end and for removable coupling to a safety tool at another end; wherein the intermediate holder element is provided with a single connecting element for removable connection to the safety tool.

By providing a holder for a safety tool with a base holder element and an intermediate holder element that can be removable coupled to each other, a holder can be obtained with a relative large flexibility with respect to the prior art safety hammer holders. Removable coupling the intermediate holder element to the base holder element may allow ease of assembly and/or flexibility of assembly of the holder. The holder can for example be adapted particularly for a certain safety hammer.

A safety tool is understood to be in particular a motor vehicle safety tool, such as e.g. a safety hammer, or a knife or a seat-belt cutter, or an ice scraper, etc. The holder and safety tool are described in the context of motor vehicle safety. The motor vehicle can be a car or a truck. However, the holder and/or the safety tool can be equally well suitable for use in other vehicles, such as a vessel or an aircraft.

Further, by providing the intermediate holder element with a single connecting element for the safety tool, the safety tool and the intermediate holder element can be connected at a single location on the safety tool, such that a simple connection between the safety tool and the holder can be obtained. By providing a single connecting element for connection at a single location on the safety hammer, the safety tool can be relatively easily and reliably, preferably with a single act of a user, connected and/or disconnected to the holder by a user. In addition, by providing the intermediate holder element with a single connecting element, the intermediate holder element may be limited in size and may be relatively compact, in particular in comparison to prior art holders for a safety tool. Since a single connecting element suffices to connect to the safety tool, the holder, in particular the intermediate holder element, more in particular the single connecting element, may be compact and/or may be limited in length and/or width and/or height. A compact size of the holder allows the holder to be positioned at more various locations in a vehicle interior. The connecting element may e.g. be a rib that connects in a groove of the safety tool or vice versa, or may be a finger that clamps behind or in a recess in the safety tool, or may be a bayonet-connection, etc. Many variants are possible of a connecting element. Preferably, the connecting element is arranged for connection to the safety tool allowing a single and/or simple act of a user, without needing additional connecting instruments such as e.g. a screw. In fact, in case of emergency, the user needs to be able to quickly and easily remove the safety tool from the holder.

Preferably, the base holder element is arranged for mounting in the interior of a motor vehicle. The base holder element may thereto be provided with a magnetic element, or with a suction cap, or with screw holes for receiving a screw, or with Velcro strips, or with clamping elements, or rib/groove mounting means, etc. Many variants are possible. More preferably, the base holder element is arranged for mounting in the interior of a motor vehicle without damaging the interior. Screws are e.g. not advisable in that respect, since a screw requires a hole in the interior element to which the holder is being mounted. Then the screw is fastened in the hole, thus impairing the vehicle interior. When mounting the holder afterwards at a different location in the vehicle interior, the impairment of the holes remains. Therefore, the base holder is preferably provided with mounting means, leaving the interior of the vehicle intact, such as clamping elements, or magnetic elements, or Velcro strips, etc.

Advantageously, the safety tool, in particular a handle of the safety tool, is arranged for receiving the connecting element at a predetermined location. This allows more easily coupling of the safety tool to the intermediate holder element and/or may provide more ease of use.

Advantageously, the base holder element and/or the intermediate holder element are manufactured in one piece, e.g. by injection moulding. For example, the base holder element and/or the intermediate holder element are manufactured from plastics.

The holder, wherein the intermediate holder element is provided with connection means for connection to the base holder element in various rotational positions.

The intermediate holder element can be removable coupled to the base holder element in various rotational positions, thereby increasing the flexibility of assembly and/or of mounting and/or of installation of the holder. The base holder element can for example be connected in an interior of a vehicle, the intermediate holder element can be positioned optimally with respect to the base holder element to provide e.g. for efficient storage of the safety tool, due to the connection means allowing various rotational positions of the intermediate holder element with respect to the base holder element. The holder can thus be positioned at more and/or more various locations in a vehicle interior, in particular in comparison to prior art holders for a safety hammer, giving the holder a larger flexibility in use.

The holder, wherein the connection means are arranged for connection to the base holder element in positions varying over 360 degrees. In an advantageous embodiment, the connection means allow rotational positions of the intermediate holder element with respect to the base holder element over 360 degrees. The various positions can be predetermined or can be smooth or continuous. For example, the positions can be predetermined to allow for a stepwise rotation with steps of e.g. 15 degrees over 360 degrees. Alternatively, there may be a smooth or continuous variation of positions over 360 degrees, lacking a predetermined provision to fix the rotational position. The intermediate holder element may then be fixed with respect to the base holder element at any rotational position, being an infinite number of rotational positions over the 360 degrees.

The holder, wherein the connection means comprise a star-like groove pattern. Such a predetermined provision to fix the rotational position of the intermediate holder element with respect to the base holder element may be provided with star-like connection means, wherein there may be between consecutive arms of the star an angle of e.g. 15 degrees or 30 degrees, or any other angle. The star-like connection means may for example be arranged as grooves on the base holder element in which a rib of the intermediate holder element may fit to determine the position of the intermediate holder element with respect to the base holder element, or vice versa.

The holder, wherein the base holder element is a U-shaped element. By providing a U-shaped base holder element, the base holder element may be easily coupled to various interior elements of a vehicle, such as a car. For example, such a U-shaped base holder element may easily be connected to the interior of a vehicle door. Between the legs of the U-shaped elements various interior elements may be received. The U-shaped holder can thus easily be relocated inside the vehicle interior when the user, e.g. thinks that another location may be, temporarily, better accessible.

The holder, wherein legs of the U-shaped base holder element are pretensioned towards each other. By pretensioning the legs towards each other, an even simpler and more reliable mounting of the holder to the vehicle interior may be obtained, while leaving the vehicle interior intact.

The holder, further comprising a clamping element for clamping the base holder element to an object. The mounting means are here embodied as a clamping element for reliably mounting the base holder element in the vehicle interior to a vehicle interior element such as a car door. In case the legs of the U-shaped base holder element may be too widely spaced to firmly connect to an object of the vehicle interior, a clamping element may be provided to clamp the base holder element to the object. The clamping element may for example be a stamp-like element provided with a threaded stem to adapt the clamping force on the object. Clamping of the legs to an object may also be provided by pretensioning of the legs towards each other. However, when the base holder element is an L-shaped element, a clamping element may be provided to allow for sufficient clamping force to the object.

The holder, wherein the intermediate holder element is connected to one leg of the U-shaped base holder element and optionally a second intermediate holder element is connected to another leg of the U-shaped base holder element. Thus, the base holder element may be used to connect various, e.g. two safety tools. For example, at one side a safety hammer may be connected and at another side an other safety tool may be connected.

A system for holding a safety tool comprising a holder and a safety tool, such as a safety hammer, wherein the holder comprises a base holder element and at least one intermediate holder element arranged for removable coupling to the base holder element at one end and for removable coupling to the safety hammer at another end; wherein the intermediate holder element is provided with a single connecting element for removable connection with the safety tool.

The holder may be used to connect to a safety hammer as described in this application, but may also used to connect other safety tools, such as e.g. a knife or a seat-belt cutter. Many safety tools, in particular vehicle safety tools, are possible.

The invention also relates to a method for assembly of a safety hammer.

Further advantageous embodiments are represented in the subclaims.

BRIEF DESCRIPTION OF THE DARWING

The invention will further be elucidated on the basis of exemplary embodiments which are represented in the drawings. The exemplary embodiments are given by way of non-limitative illustration of the invention.

In the drawings.

It is noted that the figures are only schematic representations of embodiments of the invention that are given by way of non-limited example. In the figures, the same or corresponding parts are designated with the same reference numerals.

DETAILED DESCRIPTION OF THE INVENTION

Figure 1:
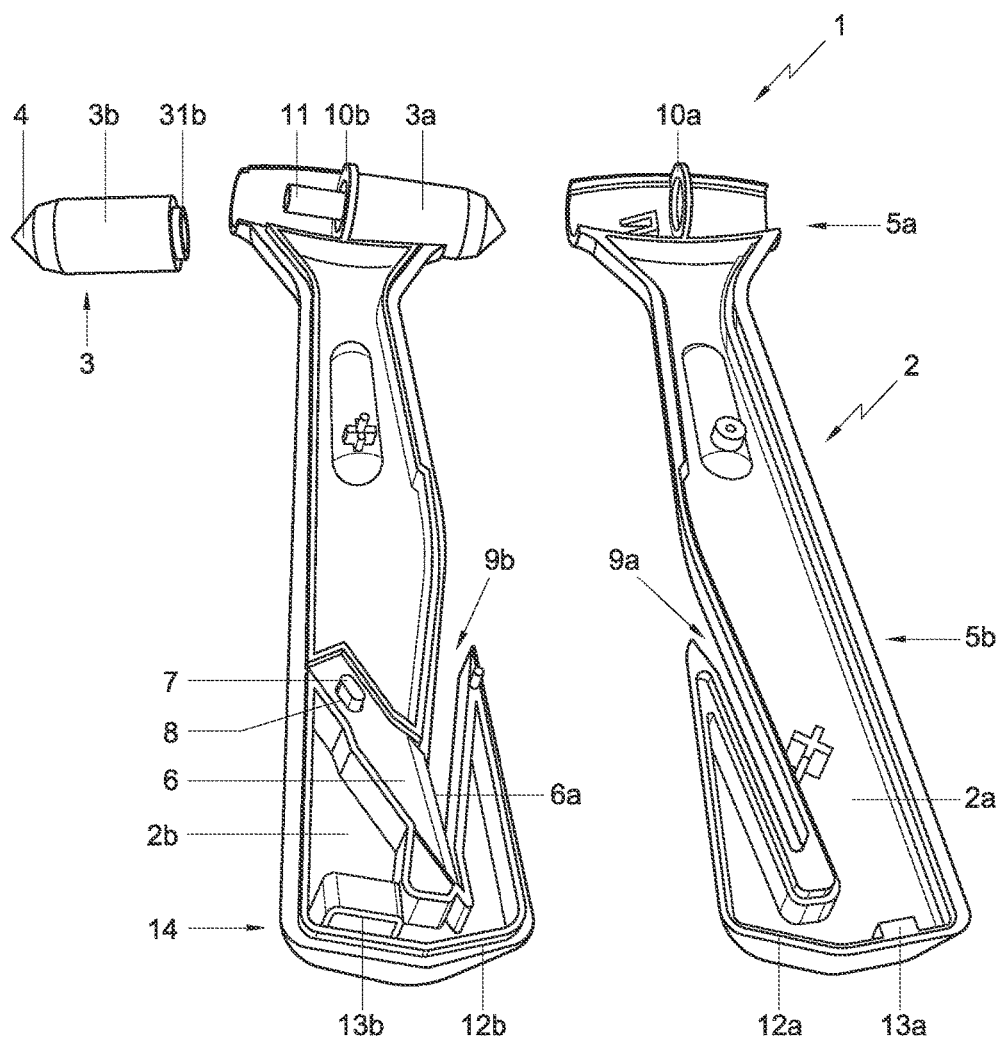
FIG. 1 shows a schematic perspective view of a laid-open first embodiment of a safety hammer according to the invention.

FIG. 1 shows schematically a first embodiment of a safety hammer 1 according to the invention. The safety hammer 1 comprises a housing 2 that, once assembled, encloses a hammer head 3. The hammer head 3 is provided with at least one end 4 for breaking glass. In this embodiment, both ends 4 of the hammer head 3 are suited for breaking glass. The ends 4 are in this embodiment conical and are preferably hardened. The hammer head 3 can be made from metal and the ends 4 can be made from hardened metal.

The housing 2 here comprises two shell parts 2a and 2b. However, the housing 2 may comprise three or more shell parts as well. The shell parts 2a, 2b are thin walled and preferably injection moulded. The two shell parts 2a, 2b here each form approximately half of the housing 2. The shell parts 2a, 2b are somewhat T-shaped. The short beam 5a of the "T" is arranged to receive the hammer head 3, while the long beam 5b of the "T" is arranged as a grip for a user. After assembly of the safety hammer 1, the hammer head 3 is partly enclosed by the shell parts 2a, 2b such that at least one end 4 extends outside the housing 2. In this embodiment, both ends 4 extend outside the housing 2 after assembly.

The safety hammer 1 is here further provided with a cutting element 6, here a knife, for cutting e.g. a seat belt. The cutting element 6 is arranged in the shell part 2b with a click-connection. The shell part 2b is provided with a finger 7 that fits in an opening 8 of the knife 6. The finger 7 is arranged to provide a click connection through the opening 8 such that the knife 6 is firmly connected to the shell part 2b. Both shell parts 2a, 2b are provided with a slit 9a, 9b, that once the safety hammer 1 is assembled, provides an access to a cutting edge 6a of the knife 6. The slits 9a, 9b are dimensioned such that a seat belt can access the slit to be cut by the knife 6, but for example a human finger cannot access the slit to avoid injuries.

According to the invention, the hammer head 3 is arranged for cooperation with the shell parts 2a, 2b for connection of the shell parts 2a, 2b via the hammer head 3. Contrary to the prior art, the hammer head 3 according to the invention forms part of the fastening system to fasten the shell parts 2a, 2b to each other under enclosure of the hammer head 3, separate fastening means such as bolts or screws, can thus be obviated. The hammer head 3 can thus be considered as the only fastening means to fasten the shell parts 2a, 2b to each other.

The shell parts 2a, 2b are here provided with a cooperating element 10a, 10b respectively to cooperate with the hammer head 3 for receiving the hammer head 3 to fasten the shell parts 2a, 2b together. The cooperating elements 10a, 10b are here provided as a ring through which the hammer head 3 can be inserted.

Figure 3:
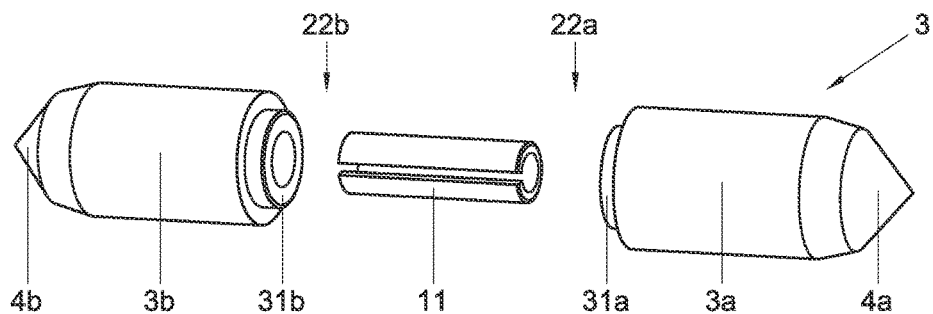
FIG. 3 shows a schematic perspective exploded view of a first embodiment of a hammer head for a safety hammer according to the invention.

The hammer head 3 here comprises two head parts 3a, 3b which can be connected to each other under cooperation with the shell parts 2a, 2b, in particular with the cooperating elements 10a, 10b of the shell parts 2a, 2b. FIG. 3 shows a first embodiment of a hammer head 3 according to the invention. The hammer head parts 3a, 3b are provided with a recess 31a, 31b, in which a bush 11 that can be inserted in the recesses 31a, 31b to form an interference fit with the head parts 3a, 3b. The connection thus obtained between the head parts 3a, 3b is a firm and tight connection, which is in general a permanent connection.

Figure 2:
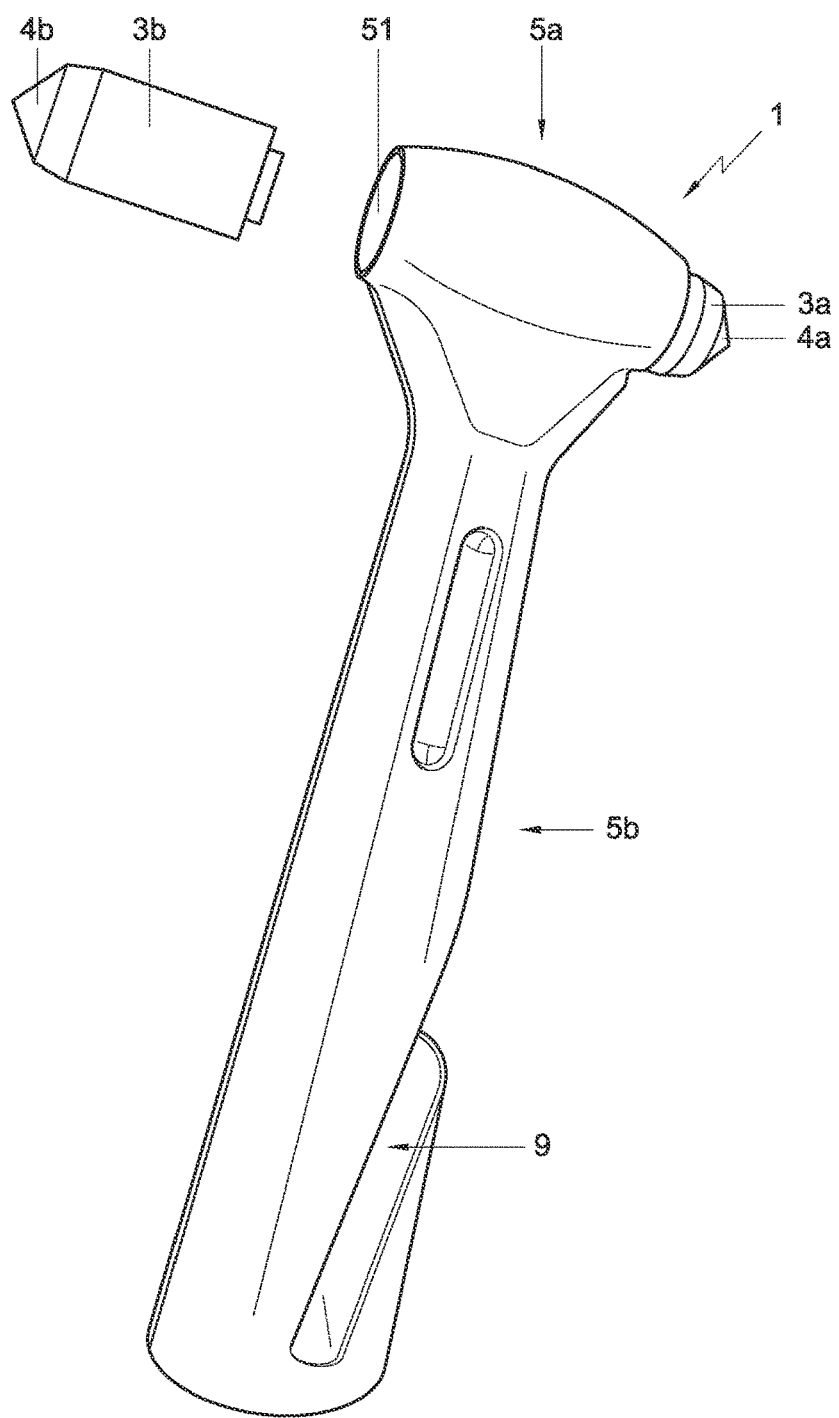
FIG. 2 shows a schematic perspective view of a partly assembly safety hammer of FIG. 1.

The assembly of the safety hammer 1 as shown in FIG. 1 can be as follows. The two shell parts 2a, 2b are provided. A first hammer head part 3a can be inserted in the inner part of the short "T"-beam 5a, of for example shell part 2b. The bush 11 is then inserted through the ring 10b of the shell part 2b into the recess 31a of the hammer head part 3a. The second shell part 2a can then be connected through the first shell part 2b by moving the cooperating element, ring 10a, over the bush 11 which extends outside the hammer head part 3a. The safety hammer 1 can then be closed by fitting the shell part 2a over the shell part 2b. The second hammer head part 3b is thereafter inserted through an opening 51 in the short "T"-beam 5a to be moved over bush 11 to form an interference fit with the bush 11, as can be seen in FIG. 2.

By receiving the bush 11 with an interference fit in the recesses 31a, 31b of the hammer head parts 3a, 3b with the rings 10a, 10b of the shell parts 2a, 2b inbetween, a firm, reliable and permanent connection can be obtained while separate fastening means can be obviated. The hammer head 3 allows for the fastening of the shell parts 2a, 2b. Cooperating means 22a, 22b are here the recesses 31a, 31b and the bush 11 allowing to fit the hammer head parts 3a, 3b to each other, under enclosure of the cooperating elements 10a, 10b of the shell parts 2a, 2b.

Instead of a bush, the hammer head part 3b can also be screwed onto the hammer head part 3a with the rings 10a, 10b clamped between the hammer head parts. Alternatively, the hammer head 3, or the hammer head parts 3a, 3b form an interference with the shell parts 2a, 2b. For example, the hammer head part 3a can firmly fit in a ring or a clamp of the shell parts 2a, 2b and the hammer head part 3b can firmly fit in a ring or a clamp of the shell parts 2a, 2b. For example grooves may be provided in the hammer head parts 3a, 3b to cooperate with cooperating elements 10a, 10b of the shell parts 2a, 2b. The cooperating elements can be a ring, or a finger, or a clamp, or an opening, or a recess, etc. In addition both hammer head parts 3a, 3b can connect to each other, e.g. via screw connection or via a click connection, or a bayonet connection, etc.

In principle, the fastening of the shell parts 2a, 2b by the hammer head 3 may provide for a sufficient and reliable fastening. However, to assist assembly of the safety hammer 1, the shell parts 2a, 2b may be provided with alignment elements 12a, 12b. In the embodiment shown in FIG. 1, the alignment elements 12a, 12b are provided as a rib 12b that falls into a groove 12a. In this embodiment, the rib 12b is an approximately circumferential rib, but the alignment elements 12a, 12b can also be provided as pin/hole elements or as an interrupted rib or as rib segments. The alignment elements 12a, 12b can be provided to align the position of one shell part with respect to the other shell part during assembly.

Figure 4:
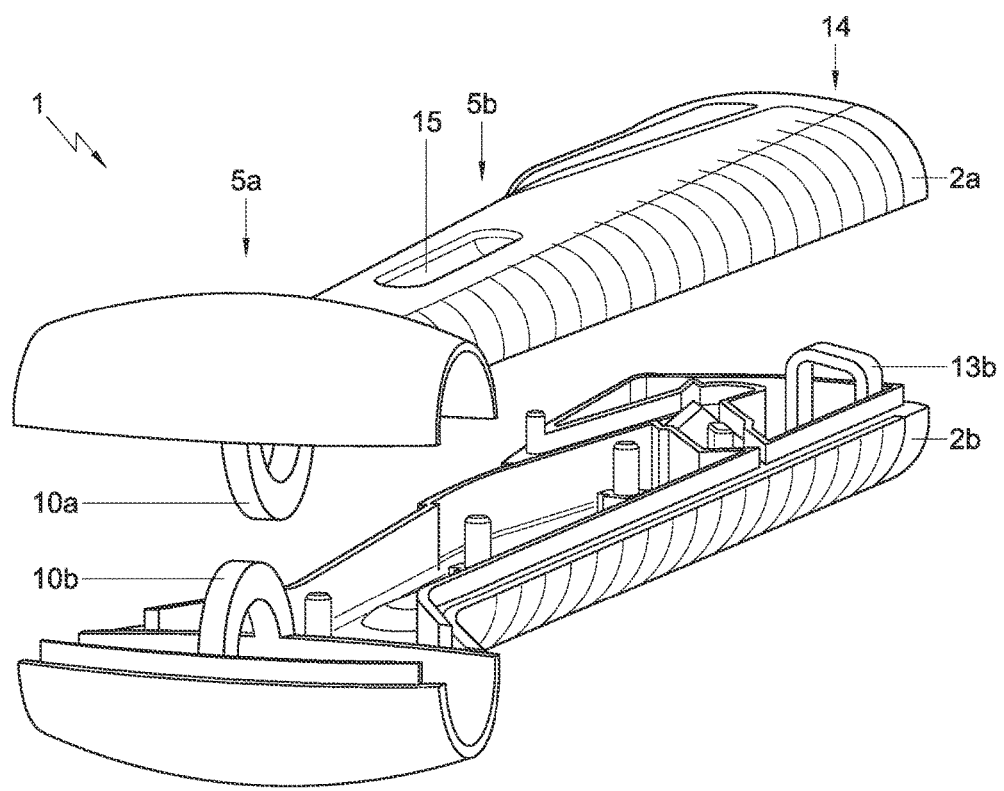
FIG. 4 shows a schematic perspective exploded view of a housing for a safety hammer according to the invention.

Further, the shell parts 2a, 2b may be provided with coupling elements 13a, 13b at a location remote from the hammer head 3. In the embodiment of FIG. 1 and FIG. 4 the coupling elements 13a, 13b are located at an end 14 of the safety hammer 1 opposite the short "T"-beam 5a. The coupling elements 13a, 13b are arranged to couple the shell parts 2a, 2b to each other prior to assembling the shell parts and fastening the shell parts 2a, 2b via the hammer head 3 such that assembly of the safety hammer 1 can be assisted. The coupling elements 13a, 13b are here provided as a hook 13a and an eye 13b. By hooking the hook 13a into the eye 13b, the shell parts 2a, 2b are coupled, which facilitates the assembly of the safety hammer 1. By coupling the shell parts 2a, 2b to each other at an end 14 remote of the hammer head 3, accidental opening of the shell parts 2a, 2b at the end 14 may be obviated and/or minimized. Other embodiments of the coupling elements may be possible, such as click fingers or a pen/hole connection, etc. The coupling elements 13a, 13b may also provide for some alignment prior to the fastening of the shell parts 2a, 2b by the hammer head 3.

Figure 10:
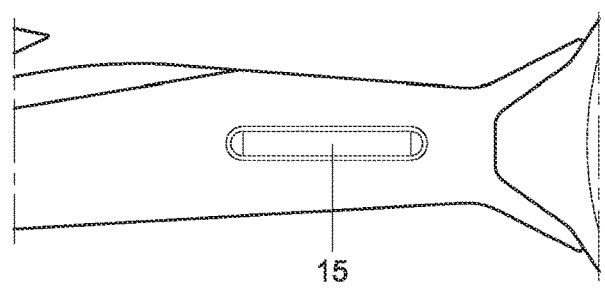
FIG. 10 shows a schematic view of a detail of the housing of a safety tool.

In FIG. 4 can be seen that the housing 2 of the safety hammer 1 is provided with a recess 15. The recess 15 is a connecting element arranged for removable connection with a holder 16. A close-up of the recess 15 is shown in FIG. 10. The connecting element 15 is in this embodiment arranged as a groove. Both shell parts 2a, 2b are provided with such a groove 15 to removable connect to the holder 16. The safety hammer 1 is provided at a single location on the grip 5b with a connecting element 15, thereby a simple and easy to handle connection can be obtained with the holder 16.

Figure 5A:
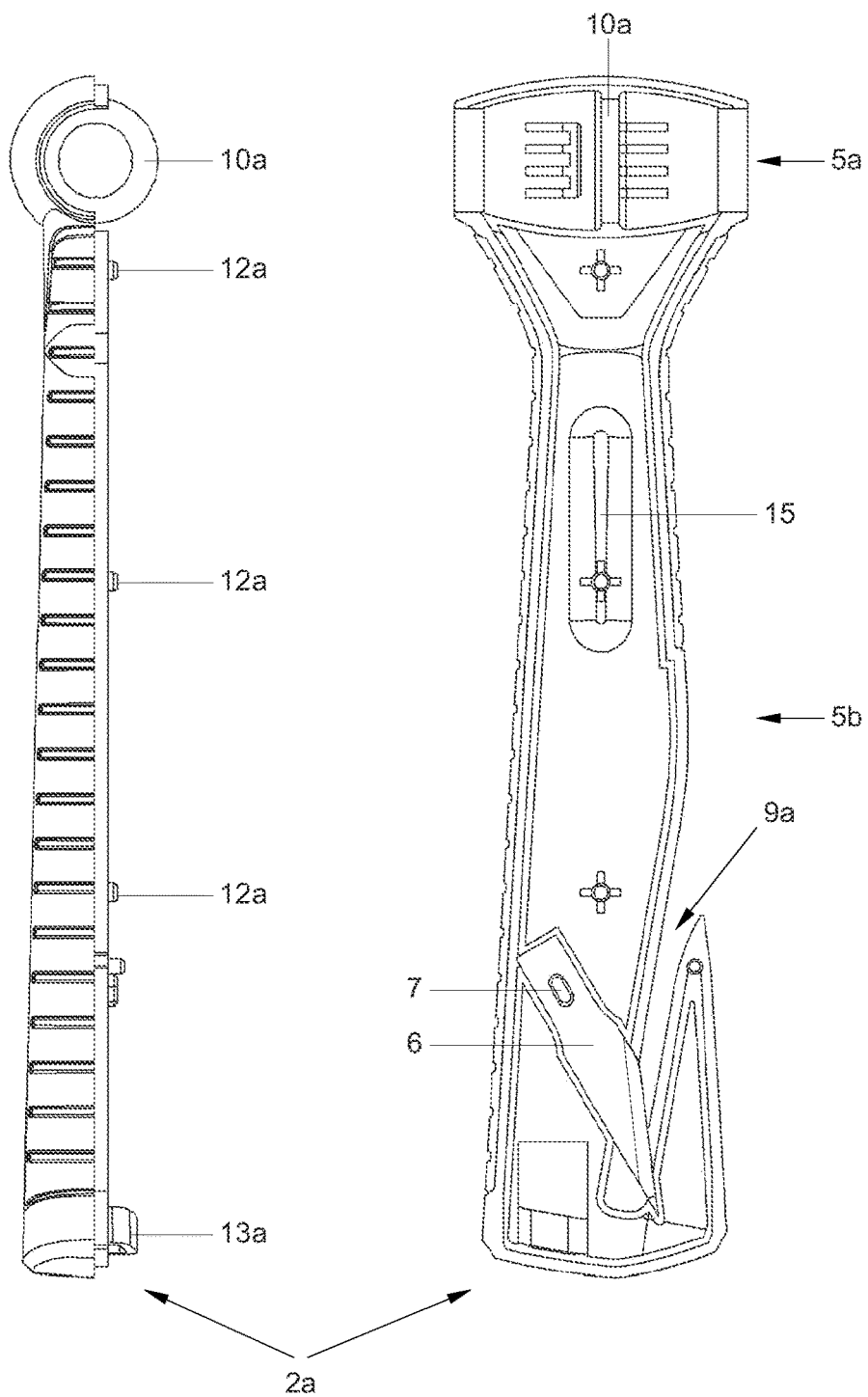
FIG. 5a shows a schematic side and front view of a first shell part of a second embodiment of the safety hammer according to the invention.
Figure 5B:
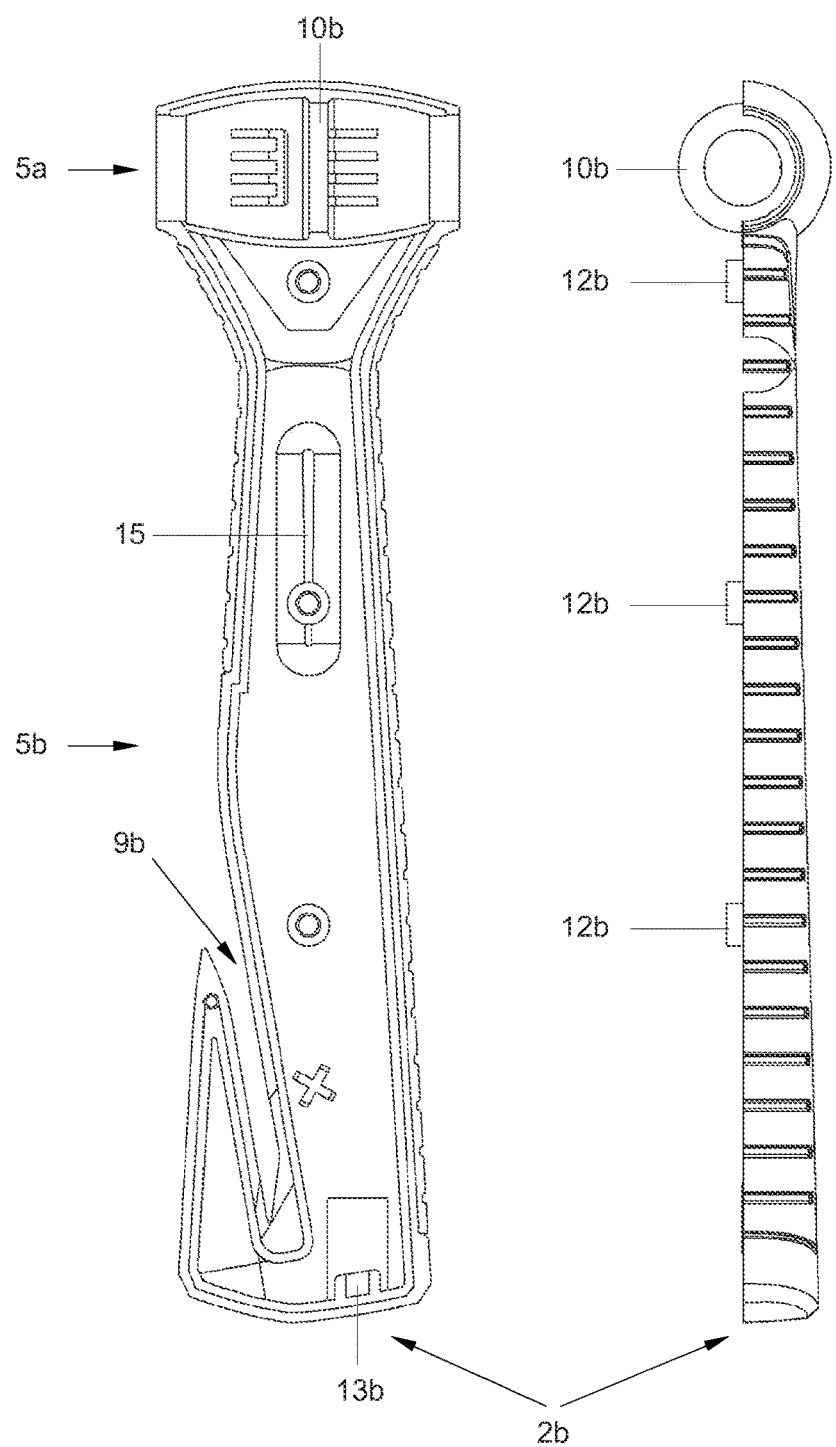
FIG. 5b shows a schematic side and front view of a second shell part of the second embodiment of the safety hammer according to the invention.

FIG. 5a and FIG. 5b show a second embodiment of shell parts 2a, 2b of a safety hammer 1 according to the invention. The shell parts 2a, 2b are approximately "T"-shaped with a short "T"-beam 5a to accommodate a hammer head 3 and a long "T"-beam 5b as a grip. The long "T"-beam 5b accommodates a slit 9 in which a knife 6 can be provided for cutting a seat belt e.g.

The shell parts 2a, 2b are provided with cooperating elements 10a, 10b which are here rings 10a, 10b. The rings 10a, 10b are arranged approximately in the middle of the short "T"-beam 5a. When the shell parts 2a, 2b are connected to each other, the rings 10a, 10b are abutting to each other to form an opening through which a hammer head 3 can be received.

The shell parts 2a, 2b are further also provided with alignment elements 12, 12b and with coupling elements 13a, 13b to assist the assembly of the safety hammer 1.

Figure 6A:
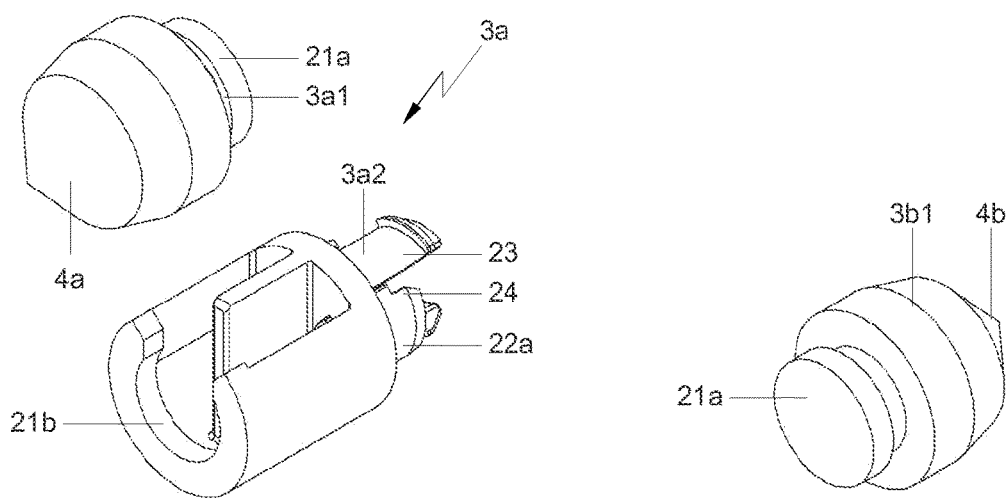
FIG. 6a shows a schematic perspective view of a first hammer head part of a second embodiment of a hammer head according to the invention.
Figure 6B:
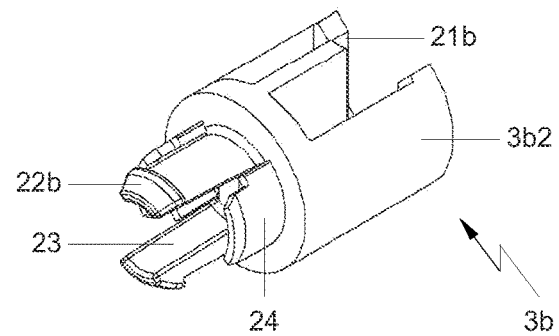
FIG. 6b shows a schematic perspective view of a second hammer head part of the second embodiment of a hammer head according to the invention.

FIG. 6a and FIG. 6b show a second embodiment of a hammer head 3 according to the invention which can cooperate with the shell parts 2a, 2b as shown in FIG. 5a and FIG. 5b. The hammer head 3 comprises in this second embodiment two hammer head parts 3a and 3b. Further, each hammer head part 3a, 3b comprises two sub-parts 3a1, 3a2 and 3b1, 3b2. The sub-parts 3a1, 3b1 are preferably from metal and have a, preferably, hardened tip 4a, 4b for breaking glass. The sub-parts 3a2, 3b2 are preferably made from plastic.

The sub-parts 3a1, 3b1 fit into the sub-parts 3a2, 3b2, the sub-parts are thereto provided with fitting means 21a, 21b. The fitting means 21a is here provided as a flange at an end of the sub-part 3a1, 3a2 opposite the hardened tip 4a, 4b. The fitting means 21b are here provided as a recess 21b in the sub-part 3a2, 3b2 in which the flange 21a firmly fits. The fitting means 21a, 21b provide for a firm and reliable connection such that once the flange 21a is fitted into the recess 21b, the connection may not become loose.

Figure 6C:
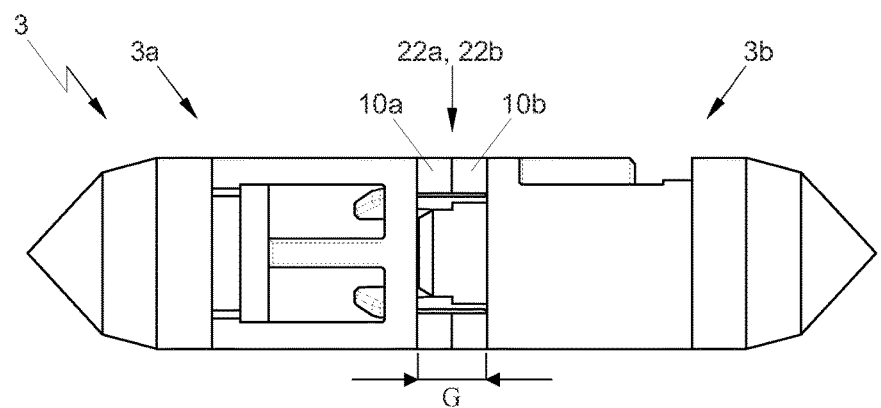
FIG. 6c shows a schematic view of the second embodiment of a hammer head according to the invention.

Further, the sub-parts 3a2, 3b2 are provided with cooperating means 22a, 22b which are here provided as click fingers 23 and ribs 24. As can be seen in FIG. 6c and in FIG. 7 the cooperating means 22a, 22b cooperate with each other to form an interference fit when the click fingers 23 click behind the ribs 24. Once fitted to each other, there remains a gap G between the hammer head parts 3a, 3b having approximately the height of the ribs 24. The gap G is of sufficient height to lock up the rings 10a, 10b therebetween, as schematically shown in FIG. 6c. By locking up the rings 10a, 10b between the hammer head parts 3a, 3b a firm connection between the shell parts 2a, 2b and the hammer head parts 3a, 3b can be obtained so a reliable fastening of the shell parts 2a, 2b is obtained.

Figure 7:
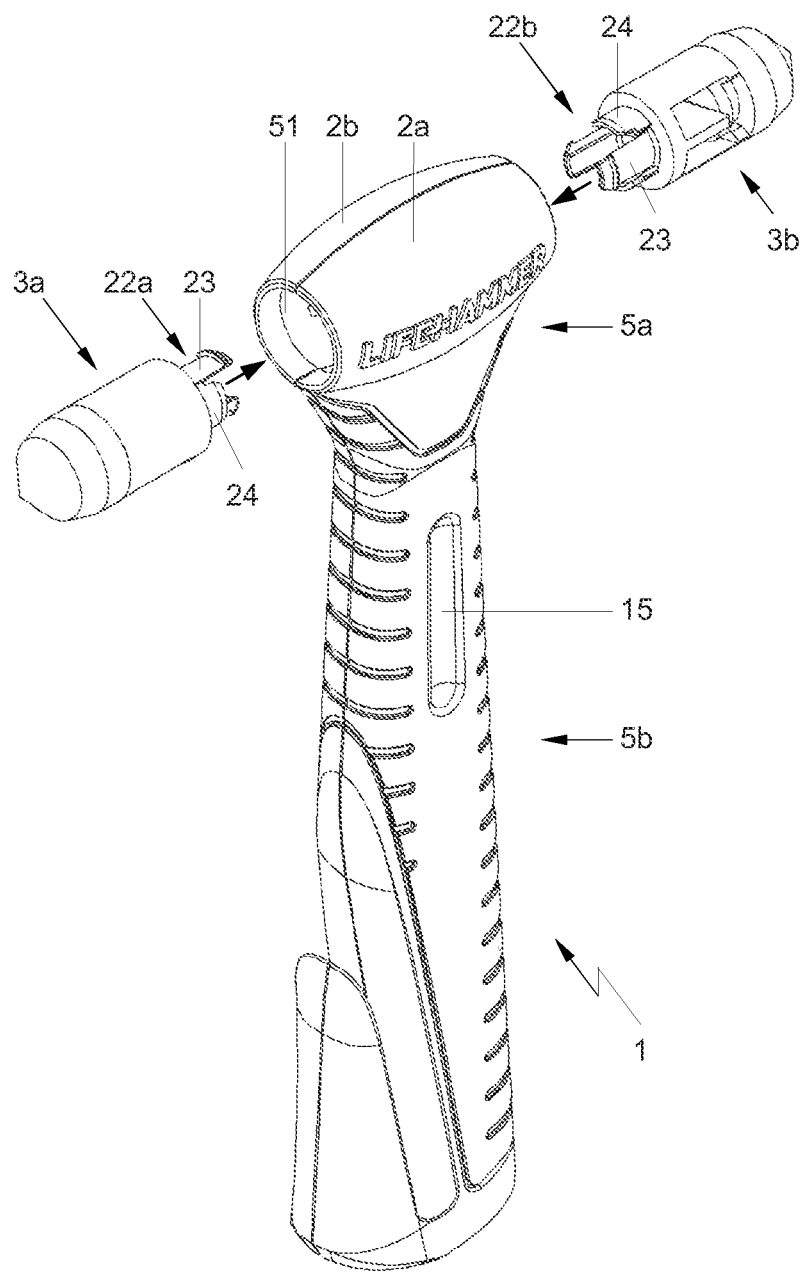
FIG. 7 shows a schematic perspective partially exploded view of the second embodiment of a safety hammer according to the invention.

FIG. 7 shows that to assemble the safety hammer 1 first the shell parts 2a, 2b are positioned over each other. For example, the coupling elements 13a, 13b are hooked into each other and the shell parts 2a, 2b are aligned on top of each other by the alignment elements 12a, 12b. Upon positioning the shell parts 2a, 2b upon each other, the cooperating rings 10a, 10b are abutting against each other.

In the openings 51 of the short "T"-beam 5a the hammer head parts 3a, 3b can be inserted until the cooperating means 22a, 22b fit into each other and provide for a firm and reliable fit of the shell parts 2a, 2b to each other via the rings 10a, 10b.

In the embodiments shown, the shell parts 2a, 2b are provided with cooperating elements 10a, 10b as ring elements. However, the cooperating elements can have various embodiments. The cooperating elements can e.g. be provided as a recess in which a hammer head part may fit, or can be provided as a threaded hole in which a hammer head part may be screwed.

Figure 8:
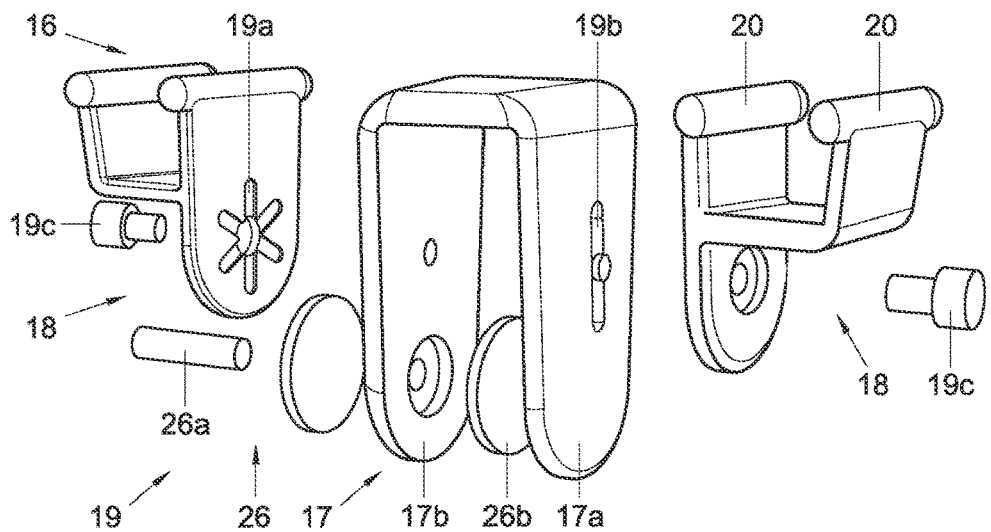
FIG. 8 shows a schematic perspective exploded view of a holder according to the invention for a safety tool.
Figure 9:
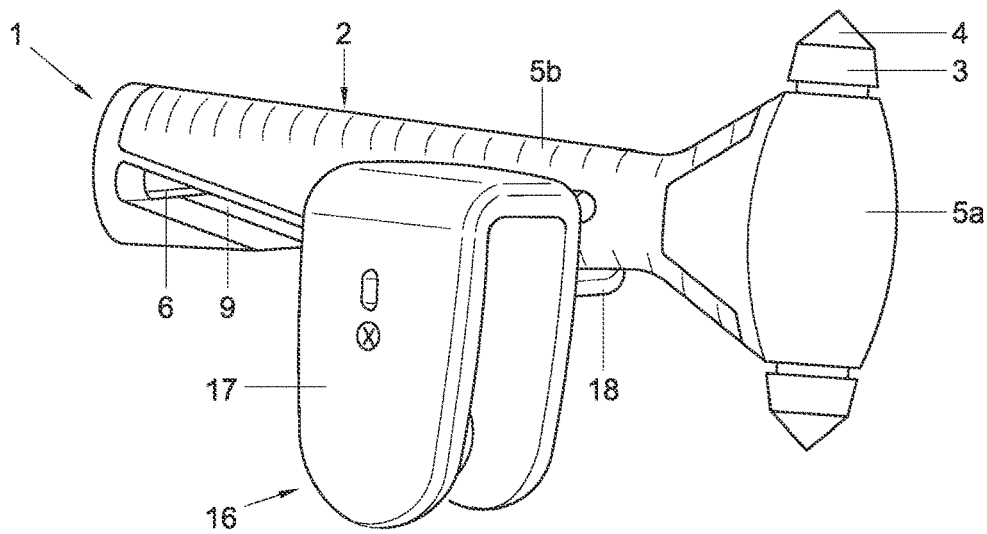
FIG. 9 shows a schematic perspective view of a holder connected to a safety tool.

FIG. 8 shows schematically an embodiment of the holder 16. The holder 16 comprises a base holder element 17 and at least one intermediate holder element 18 which are arranged for removable coupling to each other. The intermediate element 18 is arranged for removable coupling to the safety tool, in this embodiment a safety hammer 1, at one end, via the connecting element 15, and is arranged for removable coupling to the base holder element 17 at another end. The intermediate holder element 18 may be injection moulded, preferably as a single piece.

The base holder element 17 is a U-shaped element that may be injection moulded, preferably as a single piece. The legs 17a, 17b of the base holder element 17 may optionally be pretensioned towards each other. For example, during injection moulding the legs 17a, 17b may be manufactured such that there is a pretension in the material. However, the pretension may also be provided mechanically, e.g. via a spring. By providing a U-shaped element 17 with two legs 17a, 17b, the U-shaped element may be mountable in an interior of a vehicle with a variety of possibilities i.e. with a relatively large flexibility, e.g. the legs may be clamped at a car door or at a mid console or at a sun visor of the vehicle. In the embodiment of FIG. 8 both legs 17a, 17b have approximately the same length, however, the legs 17a, 17b may also have a distinct length and/or may also have other shapes, e.g. an L-shape.

The intermediate holder element 18 is at one side arranged for connection to the base holder element 17. Thereto, connection means 19 are provided. The connection means 19 allow that the intermediate holder element 18 can be connected to the base holder element 17 at various rotational positions with respect to the base holder element 17, preferably over 360 degrees. In this embodiment, the intermediate holder element 18 is provided with a star-like groove pattern 19a that cooperates with a rib 19b of a leg 17a, 17b of the base holder element 17. The arms of the star-like groove pattern 19a can be arranged over a predetermined angle, e.g. 15 degrees, or 30 degrees, allowing that the position of the intermediate holder element 18 with respect to the base holder element 17 can be adapted in steps of 15 degrees or 30 degrees or any other angle determined by the arms of the star 19a. The intermediate holder element 18 can then be connected to the base holder element 17 with a screw 19c, or any other suitable connecting element.

By providing a star-like groove pattern 19a and a rib 19b, a reliable though removable connection can be obtained between the intermediate holder element 18 and the base holder element 17. For example, when the holder 16 is attached to a different part of the interior of the vehicle, the angle of the intermediate holder element 18 with respect to the base holder element 17 can be varied to provide for efficient storage of the safety hammer 1, allowing a large flexibility in positioning the intermediate holder element 18 with respect to the base holder element 17, as can be seen in FIG. 11 and FIG. 12.

The base holder element 17 can be arranged to connect with at least one intermediate holder element 18, but can also be arranged to connect to multiple intermediate holder elements 18. Each intermediate holder element 18 may be connected to a different device or safety tool. For example, one intermediate holder element 18 can connect to a safety hammer 1, another intermediate holder element 18 can connect to an ice scraper, etc. Those devices have in common that they are provided with a connecting element 15 that cooperates with a connecting element 20 of the intermediate holder element 17. This way a flexible and modular system can be obtained to store in a reliable way multiple objects in the interior of a vehicle. The connecting elements 15, 20 are here provided as a rib or thickening 20 that fits in a groove 15. Other connecting elements 15, 20 may also be possible, e.g. a protrusion that fits in a recess or a hook that couples in a recess or teeth that couple to each other, etc. Also, a number of safety tools may be provided with a connecting element 15, such that safety tools can be exchanged to the holder, or different safety tools can be connected to the holder.

Figure 11:
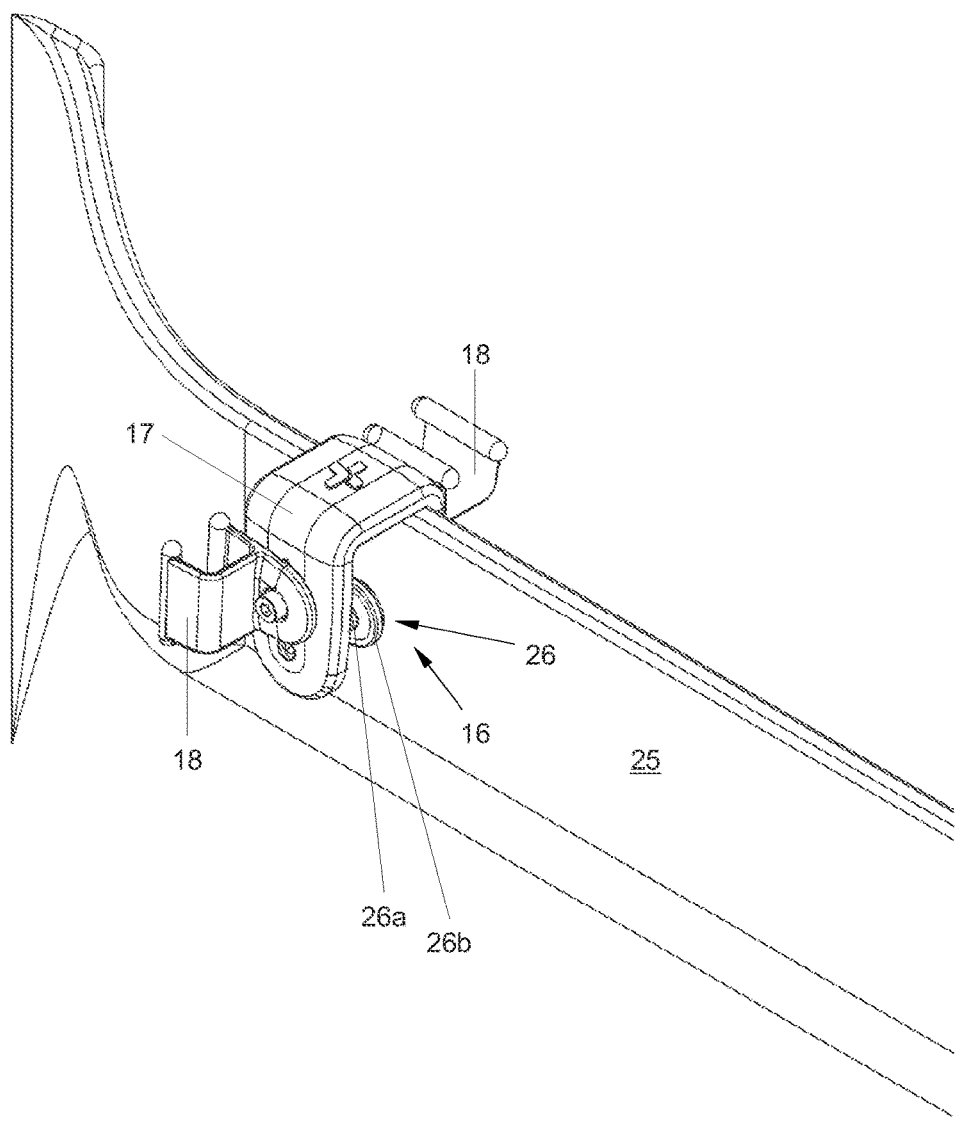
FIG. 11 shows a holder according to the invention mounted to a door storage space.
Figure 12:
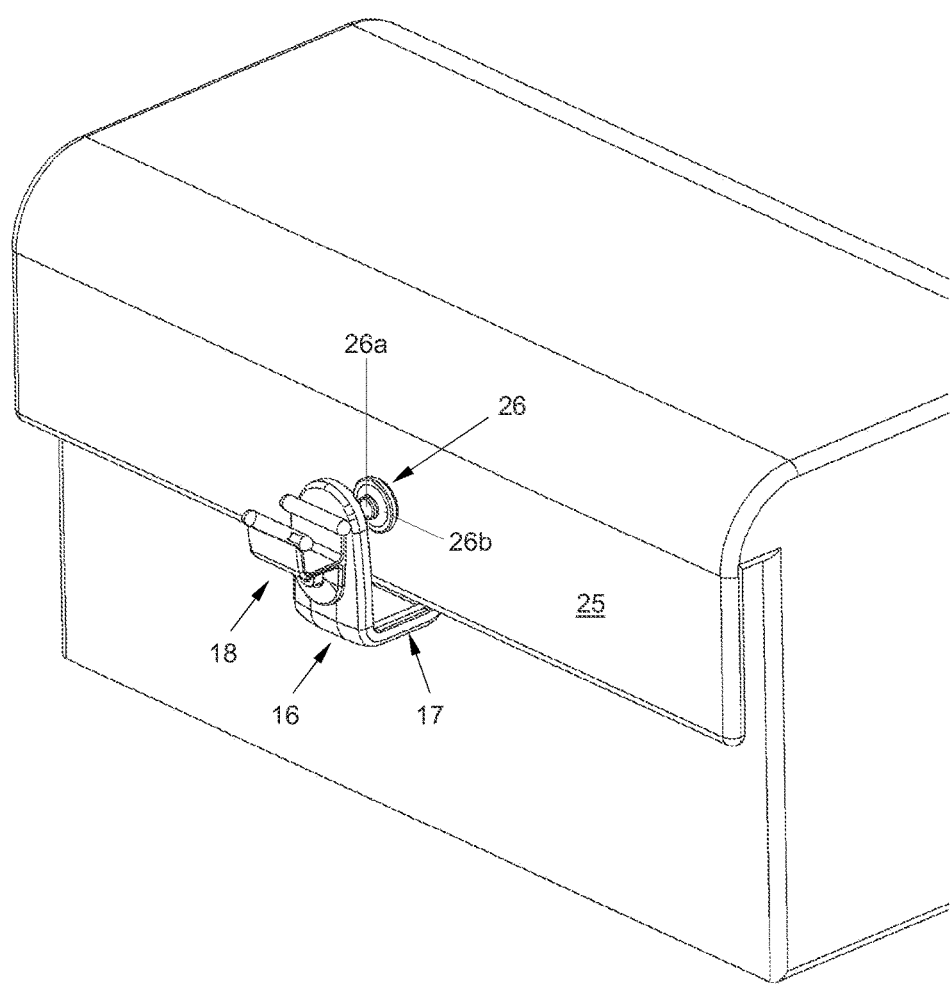
FIG. 12 shows a holder according to the invention mounted to a mid console.

FIG. 11 shows the holder 16 mounted to a door storage space 25 in a vehicle interior. The base holder element 17 is provided with two intermediate holder elements 18, which have here a different rotational orientation. In addition, a clamping element 26 as mounting means is provided comprising a stem 26a and a stamping element 26b. The clamping element 26 can be arranged to clamp the base holder element 16 to the object 25 when the distance between the legs 17a, 17b of the base holder element 16 is wider than the thickness of the object 25. The clamping element 26 can thus provide for a firm clamping of the holder 16 to the object 25. In FIG. 12 the holder 16 is mounted to an object 25, here a mid console, of a vehicle interior using the clamping element 26. The clamping element 26 is removable from the legs 17a, 17b and can be tightened depending on the clamping force required and/or depending on the distance to be overcome. The intermediate holder element 18 here as a different rotational orientation with respect to the base holder element 17 than shown in FIG. 11.

Advantageously, there is a single connecting element 15 connecting to a single connecting element 20 of the intermediate holder element 18, thus providing for a simple and compact connection between the safety hammer 1 and the holder 16. The safety hammer 1 can thus be relatively easily connected to the intermediate holder element 17, but can also relatively easily be removed from the intermediate holder element 17, preferably with a single and/or simple handling of a user. Contrary to the prior art in which often three or more connections between a safety hammer and a holder are required. By providing a single connecting element, a compact intermediate holder element may be obtained, thus a relatively compact base holder element may be obtained such that the holder may become relatively compact as well. This is contrary to the prior art holders, that often encompass the safety hammer and/or are often as large as the safety hammer.

Many variants will be apparent to the skilled person in the art. The invention is not limited to the above shown examples. For example, the base holder element or the intermediate holder element can be designed in different shapes or forms. The base holder element may be provided as a clip element which can easily be clipped to or over objects in the vehicle interior. In particular, the base holder element can be U-shaped element of which the legs are pretensioned towards each other such that the base holder element can easily be clamped over a wall element of e.g. a storage section in a door. Also, the safety hammer or safety tool may have a different shape than the "T"-shape. In particular, dimensions and angles are given by way of an example and may vary. All variants are understood to be comprised within the scope of the invention defined in the following claims.

The invention claimed is:

1. A safety hammer for breaking glass, comprising
a housing comprising a first shell part and a second shell part, each of the shell parts having a substantially symmetrical exterior shape and configured to couple with each other;
a hammer head having at least one end for breaking the glass, wherein the hammer head is at least partly enclosed by the shell parts fastened to each other whereby at least one end of the hammer head extends outside the housing;
wherein the hammer head is configured to cooperate with the shell parts hereby fastening the shell parts to each other via the hammer head; and
wherein an inner surface of the first shell part is adapted with a first cooperating element and an inner surface of the second shell part is adapted with a second cooperating element, the first cooperating element and second cooperating element being configured to cooperate with the hammer head thereby fastening at least a portion of the shell parts to each other via the hammer head, the first cooperating element and the second cooperating element each being a ring of continuous material through which the hammer head is receivable,
wherein the hammer head comprises at least two head parts of which at least one head part is arranged for cooperation with at least one shell part, and
wherein the two hammer head parts are arranged for connection to each other through the first and second cooperation element with the shell parts for fastening the shell parts.

2. The safety hammer according to claim 1, wherein the two hammer head parts are arranged for connection to each other via an interference fit.

3. The safety hammer according to claim 1, wherein the shell parts are further provided with coupling elements for coupling the shell parts together at a position remote from the hammer head.

4. The safety hammer according to claim 3, wherein the coupling elements are provided at an end of the safety hammer opposite the hammer head.

5. The safety hammer claim 1, wherein the shell parts are provided with alignment elements for aligning the shell parts with respect to each other.

6. The safety hammer according to claim 1, further provided with a connecting element for removable connection to a holder.

7. The safety hammer system according to claim 1, wherein the first cooperating element and the second cooperating element are integral with the first shell part and the second shell part, respectively.

8. A safety hammer system comprising:
the safety hammer according to claim 1; and
a holder for the safety hammer;
wherein the holder comprises a base holder element and at least one intermediate holder element arranged for removable coupling to the base holder element at one end and for removable coupling to a safety hammer at another end, and wherein the intermediate holder element is provided with a single connecting element for removable connection to the safety hammer.

9. The safety hammer system according to claim 8, wherein the intermediate holder element is provided with connection means for connection to the base holder element in various rotational positions.

10. The safety hammer system according to claim 9, wherein the connection means are arranged for connection to the base holder element in positions varying over 360 degrees.

11. The safety hammer system according to claim 9, wherein the connection means comprise a star-like groove pattern.

12. The safety hammer system according to claim 6, wherein the base holder element is a U-shaped element.

13. The safety hammer system according to claim 11, wherein the intermediate holder element is connected to one leg of the U-shaped base holder element and optionally a second intermediate holder element is connected to another leg of the U-shaped base holder element.

14. The safety hammer system according to claim 8, further comprising a clamping element for clamping the base holder element to an object.

15. Method for assembly of a safety hammer, comprising:
providing a housing comprising a first shell part and a second shell part, each of the shell parts having a substantially symmetrical exterior shape and configured to couple with each other for forming the housing of the safety hammer;
providing a hammer head having at least one end for breaking glass, wherein the hammer head is at least partly enclosed by the shell parts fastened to each other whereby at least one end of the hammer head extends outside the housing, and wherein the hammer head is configured to cooperate with the shell parts thereby fastening the shell parts to each other via the hammer head; and
fastening the first and second shell parts to each other via the hammer head under enclosure of the hammer head, such that after assembly at least one end of the hammer head extends outside the housing, wherein an inner surface of the first shell part is adapted with a first cooperating element and an inner surface of the second shell part is adapted with a second cooperating element, the first cooperating element and second cooperating element being configured to cooperate with the hammer head thereby fastening at least a portion of the shell parts to each other via the hammer head, the first cooperating element and the second cooperating element each being a ring of continuous material through which the hammer head is receivable, wherein the hammer head comprises at least two head parts of which at least one head part is arranged for cooperation with at least one shell part, and wherein the two hammer head parts are arranged for connection to each other through the first and second cooperation element with the shell parts for fastening the shell parts.

16. Method according to claim 15, further comprising coupling the at least two shell parts to each other at a position remote from the hammer head.

17. Method according to claim 15, further comprising connecting the hammer head to a cooperating element of at least one shell part.

* * * * *